(12) United States Patent
Katz et al.

(10) Patent No.: US 7,941,471 B2
(45) Date of Patent: May 10, 2011

(54) DIFFERENTIAL APPROACH TO CURRENT-MODE CHAOS BASED RANDOM NUMBER GENERATOR

(75) Inventors: Oded Katz, Haifa (IL); Dan Ramon, Yokne'am Ilit (IL); Israel A. Wagner, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 11/668,130

(22) Filed: Jan. 29, 2007

(65) Prior Publication Data

US 2008/0183785 A1 Jul. 31, 2008

(51) Int. Cl.
*G06F 1/02* (2006.01)
(52) U.S. Cl. ......................................... 708/250; 708/255
(58) Field of Classification Search ................. 708/250, 708/255
See application file for complete search history.

(56) References Cited

U.S. PATENT DOCUMENTS

| | | | |
|---|---|---|---|
| 5,500,892 A * | 3/1996 | Essig | 379/345 |
| 5,506,795 A | 4/1996 | Yamakawa | |
| 5,745,655 A | 4/1998 | Chung et al. | |
| 5,961,577 A * | 10/1999 | Soenen et al. | 708/251 |
| 6,218,973 B1 | 4/2001 | Barrett, Jr. et al. | |
| 6,732,127 B2 | 5/2004 | Karp | |
| 6,763,364 B1 | 7/2004 | Wilber | |
| 6,842,745 B2 | 1/2005 | Occhipinti et al. | |
| 6,899,240 B2 | 5/2005 | Dang et al. | |
| 7,113,116 B2 * | 9/2006 | Brewer et al. | 341/122 |
| 2003/0185392 A1 | 10/2003 | Sun | |
| 2003/0219119 A1 | 11/2003 | Kocarev et al. | |

FOREIGN PATENT DOCUMENTS

EP 1320026 A1 6/2003

OTHER PUBLICATIONS

G.C. McGonigal et al., "Generation of Noise by Electronic Iteration of the Logistic Map", IEEE Trans. Circ. Syst., vol. CAS-34, pp. 981-983, 1987.
Rodrigues-Vasquez et al., "Switched-Capacitor Broadband Noise Generator for SMOS VLSI", Electronics Letters, vol. 27, No. 21, pp. 1913-1915, Oct. 1991.
M. Delgado-Restituto et al., "A Chaotic Switched-Capacitor Circuit for 1/f Noise Generation", IEEE Trans. Circ. and Syst.-I, vol. 9, No. 4, pp. 325-328, Apr. 1992.
G. M. Bernstein and M. A. Lieberman, "Secure Random Number Generation Using Chaotic Circuits", IEEE Trans. Circ. Syst., vol. 37, pp. 1157-1164, 1990.
Espejo-Meana et al., "Application of Chaotic Switched-Capacitor Circuits for Random-Number Generation", European Conference on Circuit Theory and Design 1989, pp. 440-444, 1989.

(Continued)

*Primary Examiner* — Chuong D Ngo
(74) *Attorney, Agent, or Firm* — Suzanne Erez (57) ABSTRACT

Disclosed is method and chaos circuit for a random number generator comprising: a differential sample and hold circuit portion having a first and a second differential signal input and a first and a second differential signal output, a differential non-linear discriminator circuit portion that applies a differential discrimination function upon the first and the second differential signal output and outputs a first and a second discriminated signal, where the first and the second discriminated signals are also coupled to the first and the second differential signal inputs via a first and a second loop feedback.

18 Claims, 4 Drawing Sheets

OTHER PUBLICATIONS

T. Stojanovski, J. Pihl, L. Kocarev, "Chaos-Based Random Number Generator—Part II: Practical Realization", IEEE TRans. Circuits Syst. I: Fund. Theory Application, vol. 48, No. 3, pp. 382-385, Mar. 2001.

C. C. Wang et al., "Switched-Current 3-Bit CMOS 4.0 MHz Wideband Random Signal Generator" IEEE J. Solid State Circuits, vol. 40, No. 6, Jun. 2005.

Security Requirements for Cryptographic Modules, Federal Information Processing Standards FIPS 140-2, May 2001.

M. Delgado-Restituto, F. Medeiro, A. Rodriguez-Vazquez, "Nonlinear Switched-Current CMOS IC for Random Signal Generation" Elec. Lett., vol. 29, No. 25, pp. 2190-2191, Dec. 1993.

* cited by examiner

DIFFERENTIAL APPROACH TO CURRENT-MODE CHAOS BASED RANDOM NUMBER GENERATOR

FIELD OF THE INVENTION

The present invention relates generally to the field of generating random numbers, and in particular, to an Integrated Circuit ("IC") and method for generating a random number sequence.

BACKGROUND

Proposals for analog noise generation using chaotic circuits preceded the works on chaotic Random Number Generators ("RNG's"). White noise generation using the logistic map was analyzed in "Generation of Noise by Electronic Iteration of the Logistic Map" (G. C. McGonigal and M. I. Elmasry, IEEE Trans. Circ. Syst., vol. CAS-34, pp. 981-983, 1987), while for the same purpose a 1D piecewise linear map was used in "Switched-capacitor broadband noise generator for CMOS VLSI" (Rodriguez-Vasquez, M. Delgado, S. Espejo, and J. L. Huertas, Electronics letters, vol. 27, no. 21, pp. 1913-1915, October 1991. In "A chaotic switched-capacitor circuit for 1/f noise generation" (M. Delgado-Restituto, A. Rodriguez-Vasquez, S. Espejo, and J. L. Huertas, IEEE Trans. Circ. and Syst.-I, vol. 9, no. 4, pp. 325-328, April 1992) hopping transitions of a 1D piecewise linear chaotic map are used for 1/f noise generation. Some of these papers also mention RNG as possible application of their circuits.

Still the era of chaotic RNGs begins with the works of Bernstein and Lieberman (G. M. Bernstein and M. A. Lieberman, "Secure random number generation using chaotic circuits", IEEE Trans. Circ. Syst., vol. 37, pp. 1157-1164, 1990), and Espejo-Meana et al. (S. Espejo-Meana, A. Rodriguez-Vazquez, J. L. Huertas, and J. M. Quintana, "Application of chaotic switched-capacitor circuits for random-number generation", European conference on circuit theory and design 1989, pp. 440-444, 1989). In these two papers and in those following them, chaotic circuits serve as physical sources of randomness. Tent map implemented via switched-capacitor circuits and a first-order nonuniformly sampling digital phase-locked loop is used to produce a binary random sequence through a binary quantization of a chaotic signal.

Failures or drops in performances may silently occur in classical RNGs, and periodic check-ups (via the black magic of complicated statistical tests) and tune-ups are necessary to maintain the performances. Using chaotic circuits, a possible solution for this problem can be achieved by tuning the nominal parameter values to lie in the middle of the region of parameter values that provide a chaotic behavior. However, in today IC technology the process variations, power supply fluctuations, temperature changes, clock feed-through and other influences are likely to cause the nonlinear circuit to leave the parameter region of chaotic behavior.

The availability of high quality random number generators is essential to the effectiveness of a cryptographic system. With the advent of very large-scale integrated circuits (VLSI), and the embodiment of cryptographic systems in VLSI, it is important that component random number generators be compatible with VLSI circuit processing. Various pseudo-random number generators have been developed in the prior art, however they are all subject to attack by an eavesdropper with the intention of circumventing the cryptographic system.

Figure 1A:
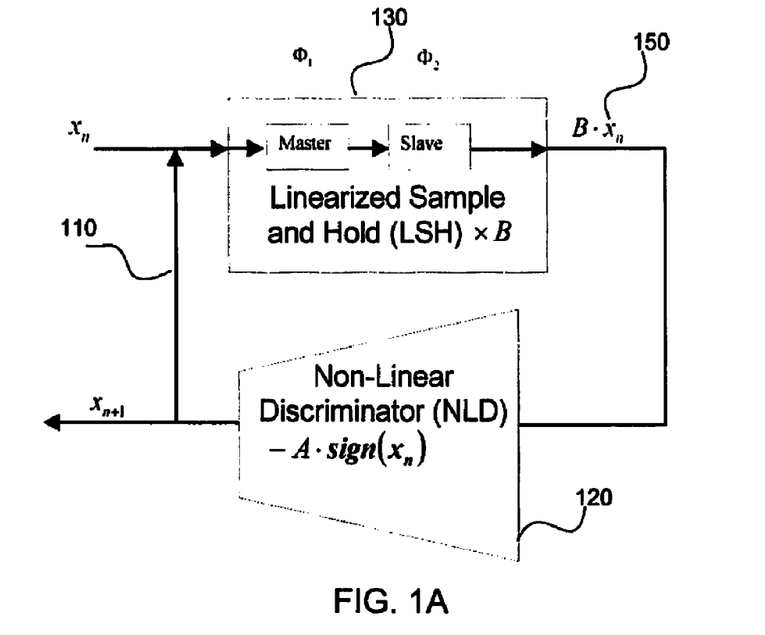
FIG. 1A shows a block diagram of a single ended chaos circuit according to the prior art.
Figure 1B:
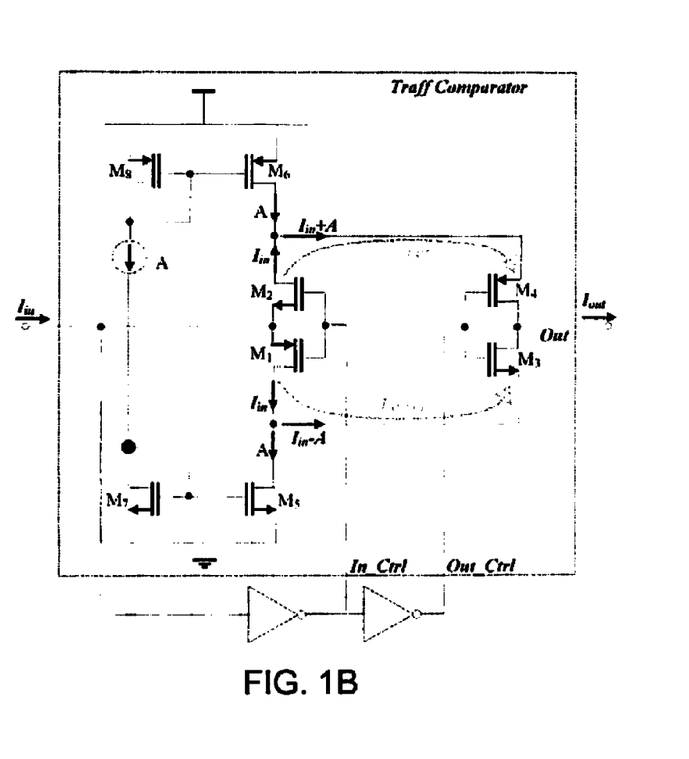
FIG. 1B shows a block diagram of a single ended Non-Linear Discriminator (NLD) which may be employed by the circuit shown in FIG. 1

Turning now to FIG. 1A there is shown an exemplary single ended chaos circuit. The signal X[n] (140) enters the Linearized Sample and Hold (LSH) circuit portion (130), the output of the LSH is: B*X[n] (150)—wherein B is a predefined constant. The output of the LSH is then used as the input of a Non-Linear Discriminator (NLD), which is depicted in FIG. 1B as well.

The NLD extracts the SIGN of the entered signal, meaning, if the signal is equal or higher than a certain threshold, then SIGN(X) is "+" otherwise it is "−", wherein "+" and "−" are used as unary operators. The NLD outputs equals: −A*SIGN(X[n]) (160), wherein "A" is a predefined constant.

The single ended chaos architecture may be characterized by a one-loop feed back (110) which returns the output of the Non-Linear Discriminator (NLD) to the input of the Linearized Sample and Hold (LSH).

The Finite Difference Equation (FDE), which is employed by this circuit, is very sensitive to the value of equation coefficients and equation non-idealities. Circuits implementing chaotic FDE must be very accurate and bounded with narrower margins than those needed by most analog applications.

FDE non-idealities and small variations in the coefficients may originate from variation in operation conditions and process. Previous single ended chaos-based IC implementations were tunes to function under nominal conditions, but their performance degraded a corner condition.

The problem of degraded performance at corner condition may aggravate in today's analog IC's that work under strict voltage budget, and have a reduced overdrive voltage.

Therefore because of the problems described above, there exists a need in the field of IC design and fabrication for an improved pseudo-random numbers generator using chaos circuits.

SUMMARY OF THE INVENTION

The present invention relates to random number generation using an integrated circuit. According to some embodiments of the present invention, there is provided a circuit including a Differential Sample and Hold circuit portion. According to further embodiments of the present invention, there may be provided a Differential Discriminator circuit portion, which discriminator circuit portion may be of a non-linear type.

In accordance with a first aspect of the present invention a circuit for generating random signal is presented. The circuit may include at least one differential component adapted to use a delta between two signals to generate two output signals.

In accordance with a second aspect of the present invention a method of generating a random signal is presented. The method may include using a delta between two signals to generate two output signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention relates to random number generation using an integrated circuit. According to some embodiments of the present invention, there is provided a circuit including a Differential Sample and Hold circuit portion (DSH). According to further embodiments of the present invention, there may be provided a Differential Discriminator circuit portion, which discriminator circuit portion may be of a non-linear type.

According to some embodiments of the present invention, a signal X[n] (denoted as "X") may be divided to two differential signals, $X^n[n]$ and $X^p[n]$, wherein $X^n[n]$ and $X^p[n]$ may be defined as:

$$X^n[n]=(-)X[n]+CM$$

$$X^p[n]=X[n]+CM$$

Wherein, CM stands for Common Mode noise signal, which signal is generated due to the circuit structure and constraints.

According to yet further embodiments of the present invention, the two signals $X^n[n]$ ("$X^n$") and $X^p[n]$ ("$X^p$") may be used as a first and second input signals of the DSH.

According to further embodiments of the present invention, the output signals of the DSH, denoted respectively by $X^1$ and $X^2$, may be calculated according to the following formula:

$$X^1[n]=X^p[n]-X^n[n]=2*X[n]$$

$$X^2[n]=X^n[n]-X^p[n]=(-)2*X[n]$$

According to some embodiments of the present invention, the two signals $X^1$ and $X^2$, may be used as input signals for the Differential Non-Linear Discriminator (DNLD). According to yet further embodiments of the present invention, the DNLD may extract the value of SIGN (X) and SIGN(-X) from input signals $X^1$ and $X^2$, Wherein SIGN(Y) is a function defined as $$\begin{aligned} SIGN(Y) &= + \text{ if } Y >= 0 \text{ or } X^1 > X^2 \\ &= - \text{ if } Y < 0 \text{ or } X^1 < X^2 \end{aligned}$$

("+" and "−" are used here as Unary operators)

According to yet further embodiments of the present invention, the output of the DNLD may be two signals defined by:

$$OUTPUT1[n]=-A*SIGN(X)$$

$$OUTPUT2[n]=-A*SIGN(-X)$$

(wherein "A" is a predefined constant)

According to further embodiments of the present invention, OUTPUT1[n] signal may be connected via a feedback loop to the first DSH input, accordingly we can denote OUTPUT1[n] as $X^p$[n+1]. According to yet further embodiments of the present invention, OUTPUT2[n] signal may be connected via a feedback loop to the second DSH input, accordingly we can denote OUTPUT2[n] as $X^n$[n+1].

According to some embodiments of the present invention, the use of the Differential Sample and Hold (DSH) circuit portion results in doubling the input signal (as shown hereinabove in the formulas of $X^1$[n] and $X^2$[n]), using only KCL (Kirchoff current law), without the use of a current mirror, resulting in a circuit with higher linearity, a wider dynamic range, a more robust signal application and eliminating the common mode interference.

According to yet further embodiments of the present invention, the differential circuit design may also generate a random bit stream with improved statistical properties. The statistical properties may be parameters such as: Entropy, Mixing, Autocorrelation, Zero-to-one ratio, or Other parameters known in the art.

According to further embodiments of the present invention, the use of the Differential Sample and Hold (DSH) circuit portion may result in intrinsically producing a symmetric map.

According to some embodiments of the present invention, the use of the Differential Non-Linear Discriminator (DNLD) circuit portion may result in that the input signals are compared at the differential amplifier input, thereby avoiding the need for reference signal.

According to some embodiments of the present invention, the differential approach may also result in superior robustness to supply-voltage-temperature and process variations.

Figure 3:
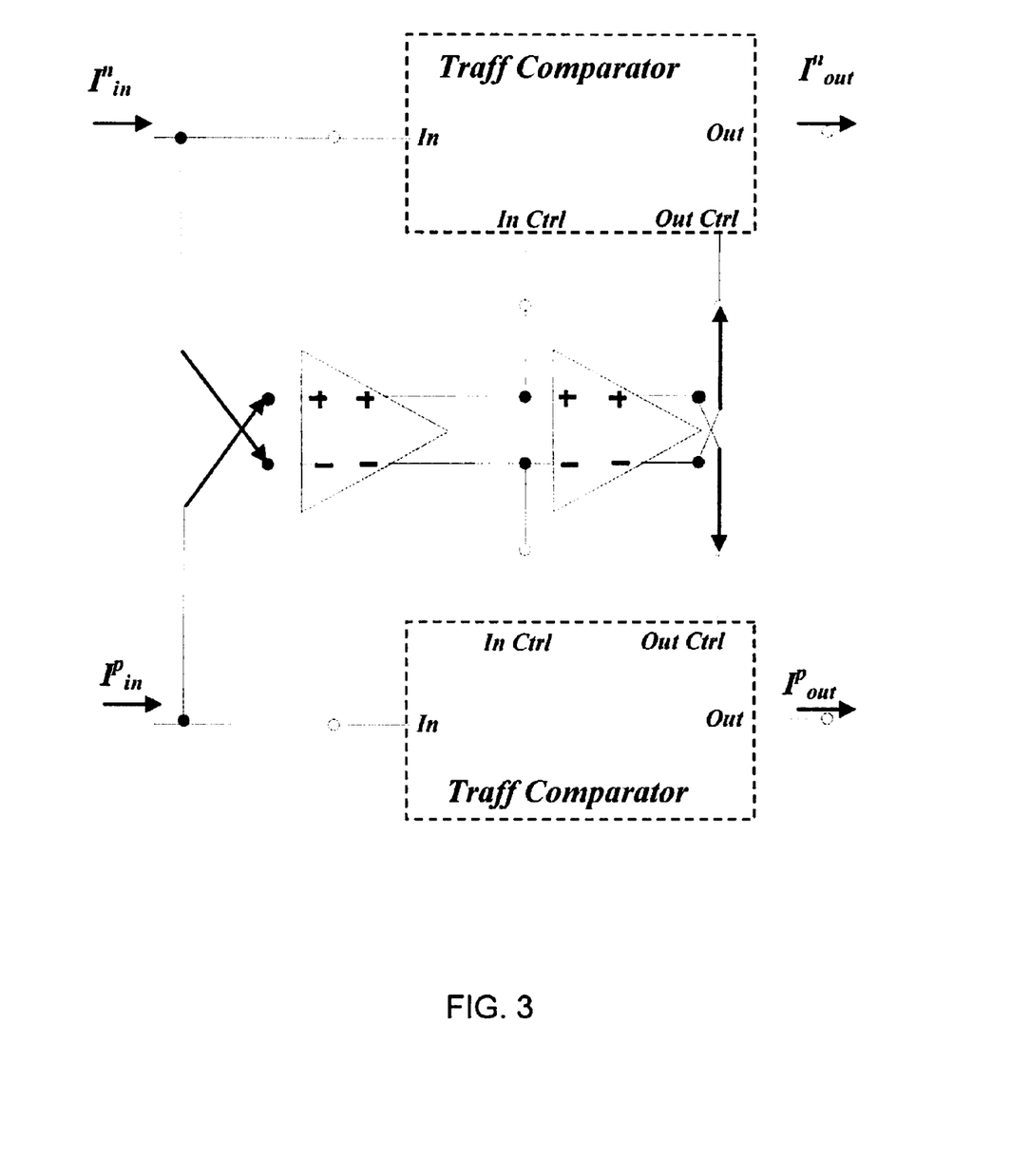
FIG. 3 shows a block diagram of a Differential Non-Linear Discriminator according to some embodiment of the present invention.
Figure 4:
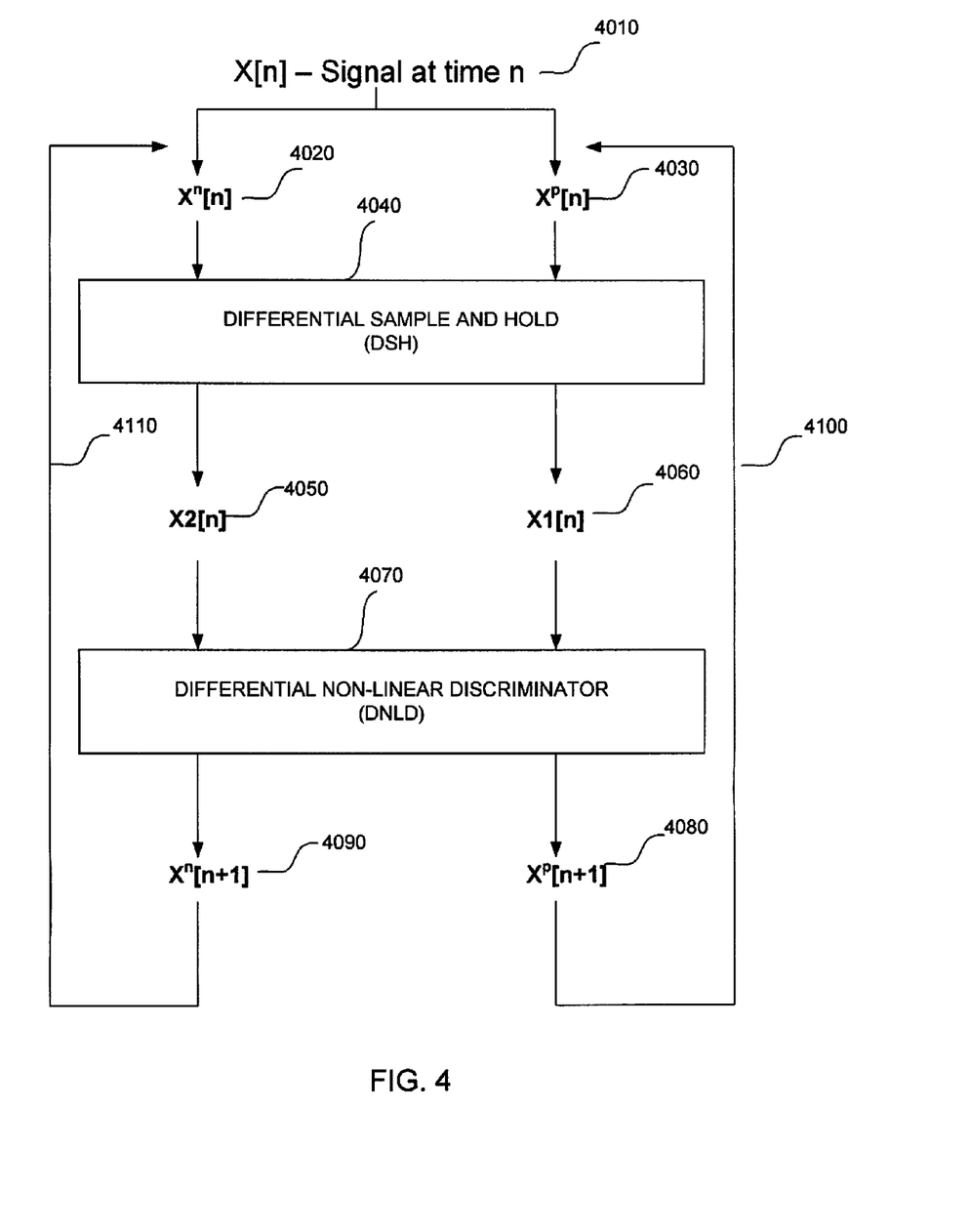
FIG. 4 depicts a flow diagram of an input signal to the Differential chaos circuit according to some embodiment of the present invention.

Turning now to FIG. 4, there is shown a flow diagram of an input signal according to one embodiment of the present invention. The flow diagram may be described in conjunction with FIG. 2, there is shown a block diagram of a Differential Chaos circuit according to some embodiments of the present invention. FIG. 4 may also be described in conjunction with FIG. 3, there is shown a block diagram of a Differential Non-Linear Discriminator according to some embodiments of the present invention.

Figure 2:
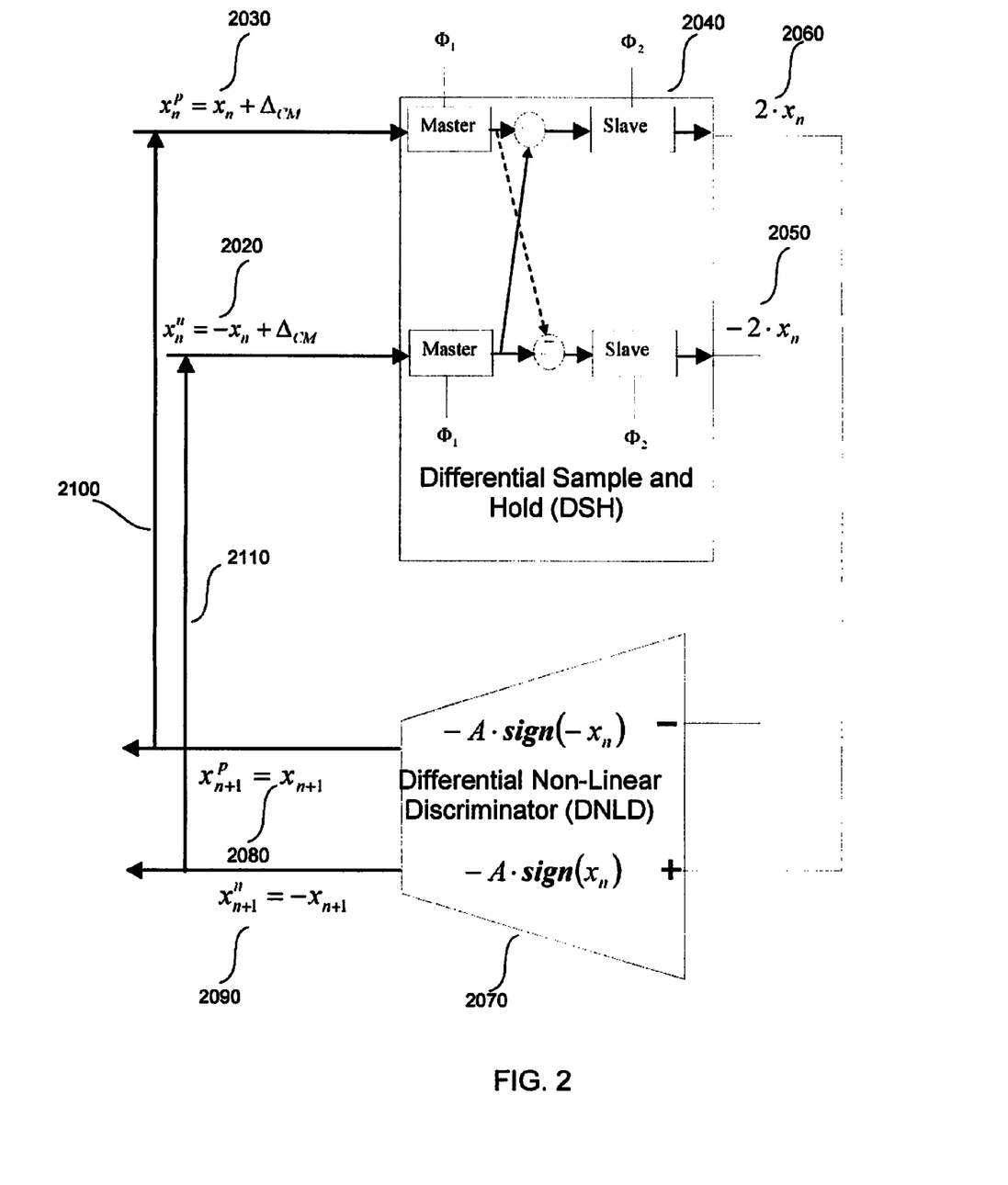
FIG. 2 shows a block diagram of a Differential Chaos circuit according to some embodiment of the present invention.

According to some embodiments of the present invention, the signal X[n] (4010), which is a differential analog signal, $X^n[n]$ (4020) and $X^p[n]$ (4030), which two signals also appear in FIG. 2 denoted by 2020 and 2030 respectively, include both the differential component X[n] and the common mode component CM According to some embodiments of the present invention, the two signals may be represented by the following formula:

$$X^n[n]=(-)X[n]+CM$$

$$X^p[n]=X[n]+CM$$

Wherein, CM stands for Common Mode noise signal, which signal is generated due to the circuit structure and constraints.

According to some embodiments of the present invention, the two signals $X^n$ and $X^p$, may be used as input signals to a Differential Sample and Hold (DSH) element (4040). A DSH also appears in FIG. 2 as element 2040.

According to some embodiments of the present invention, the output of the DSH may be two or more signals, the two outputs signals of the DSH are denoted as $X^1[n]$ (4060) and $X^2[n]$ (4050).

According to further embodiments of the present invention, the signals $X^1[n]$ and $X^2[n]$ may be generated using a differentiation action of the two input signal of the DSH (4030 and 4020), hence, the two output signal may be defined by the following formulas:

$$X^1[n]=X^p[n]-X^n[n]=2*X[n]$$

$$X^2[n]=X^n[n]-X^p[n]=(-)2*X[n]$$

The outcomes of the above formulas are also shown in FIG. 2, denoted by 2050 and 2060.

According to further embodiments of the present invention, the signals $X^1[n]$ and $X^2[n]$ may be used as the input signals to a Differential Non-Linear Discriminator (4070). The DNLD also appears in FIG. 2 as element 2070 and FIG. 3 shows a block diagram depicting an embodiment of a DNLD.

According to yet further embodiments of the present invention, the output signals of the DNLD may be defined by:

OUTPUT1*[n]*=-A*SIGN(X)

OUTPUT2*[n]*=-A*SIGN(-X)

Wherein "A" is a predefined constant and the function SIGN(X) was described hereinabove.

According to yet further embodiments of the present invention, the output signals of the DNLD, are connected via one or more feedback loops to the input of the DSH (4040). The embodiment described here is of two loop feedbacks that are denoted as 4100 and 4110 and also appear in FIG. 2 as 2100 and 2110, respectively.

According to yet further embodiments of the present invention, due to feedback loops 4110 and 4100, signals OUTPUT1 and OUTPUT2, described hereinabove, may be defined by the following formula:

$$OUTPUT1=X^n[n+1] \quad (4090)$$

$$OUTPUT2=X^p[n+1] \quad (4080)$$

According to yet further embodiments of the present invention, signals $X^n[+1]$ and $X^p[n+1]$ may be generated in a recursive manner, and may also be defined by:

$$X^n[n+1]=(-)X[n+1] \quad (2090)$$

$$X^p[n+1]=X[n+1] \quad (2080)$$

According to some embodiments of the present invention, the DSH (2040) circuit portion may comprise a master and slave gates at the two differential branches and a subtractor between them. The differential current mode design is used in order to eliminate the single-ended circuit drawbacks and its robustness problems. In FIG. 2 we present the block diagram of the differential chaos circuit. The DSH has two inputs, $x_n^p=x_n+\Delta_{CM}$ and $x_n^n=-x_n+\Delta_{CM}$ [10]. After the master gates, each signal (current) is being mirrored to the opposite channel and subtracted from the channel original value. In view of the fact that the DSH is a current mode circuit, the subtraction can be simply implemented at a single node according to Kirchoff current low. The subtractor, which benefits from the accuracy and simplicity of the Kirchoff law, has two main functions: i) eliminating the common mode signal, $\Delta_{CM}$, ii) doubling each signal at the DSH slave gates. Considering KCL, it is clear that upon subtraction each of the currents is multiplied exactly by two regardless of the current level, process corners and operating conditions, achieving robust signal multiplication. Therefore, the DSH posses higher linearity and can be used over a dynamic range much wider, than the single ended LSH. Further, the DSH intrinsically produces a symmetric map ($B_L=B_R$), since the two differential branches are being subtracted from each other. Hence, any deviation in one of the differential branches will be averaged and copied to the other branch at the subtractor node.

Turning now to FIG. 3 there is a shown a block diagram of an exemplary DNLD (2070), according to some embodiments of the present invention. The DNLD may comprise of inverters, FET transistors and other circuitry components, The DNLD design, which is very similar to the single ended NLD in FIG. 1b. The DNLD consists of two Träff comparators for each of the differential channels. However, instead of controlling each channel by inverters, the control is being preformed differentially by two double ended differential amplifiers. As was shown before, in a single ended NLD the $-A \cdot sign(x_n)$ function is carried out by examining the polarity of the input current $I_{in}$, but may suffer inaccuracy for low current levels as a result of mismatch between LSH and NLD.

Contrary to that, using the differential scheme the input currents $I^p_{in}$ and $I^n_{in}$ are compared at the differential amplifier input, and the ±A decision is made accordingly, thus eliminating any current offset.

This novel approach to a chaos based RNG, utilizes a differential sample and hold circuit (DSH), and a differential non-linear discriminator (DNLD). We show that the proposed differential design can intrinsically realize a more ideal chaotic FDE with improved symmetry, smaller offset, higher linearity and wider dynamic range. As a result, the differential circuit generates a bit-stream with improved statistical properties, exhibits superior robustness and overcomes the drawbacks of single ended chaos circuits.

While certain features of the invention have been illustrated and described herein, many modifications, substitutions, changes, and equivalents will now occur to those skilled in the art. It is therefore, to be understood that the appended claims are intended to cover all such modifications and changes as fall within the true spirit of the invention.

What is claimed:

1. A differential chaos circuit for generating a random signal comprising:
   a differential sample and hold circuit portion having a first and a second differential signal input and a first and a second differential signal output, and;
   a differential non-linear discriminator circuit portion that applies a differential discrimination function upon the first and the second differential signal output and outputs a first and a second discriminated signal, where the first and the second discriminated signals are also coupled to the first and the second differential signal inputs via a first and a second loop feedback.

2. The circuit according to claim 1, wherein the differential non-linear discriminator circuit portion extracts the polarity of the first and the second differential signal outputs.

3. The circuit according to claim 2, wherein the first and second discriminated signals are a function of the first and the second differential signal outputs polarities.

4. The circuit according to claim 2, wherein the differential sample and hold circuit portion generates an intrinsic symmetric map.

5. The circuit according to claim 2, wherein the differential non-linear discriminator circuit portion compares the first and the second differential signal outputs at a differential amplifier input.

6. The circuit according to claim 1, wherein the first and the second differential signal inputs are differential signals divided from a single signal into two differential signals.

7. The circuit according to claim 6, wherein the first and the second differential signals are represented by the following formula:

$$x^n[n]=(-)x[n]+CM,$$

$$x^p[n]=x[n]+CM,$$

wherein $x^n[n]$ and $x^p[n]$ are the first and the second differential signals, $x[n]$ is a differential component, and CM is a common mode component.

8. The circuit according to claim 1, wherein the first and the second differential signal output is represented by the following formula:

$$x^1[n]=x^p[n]-x^n[n]=2x[n],$$

$$x^2[n]=x^n[n]-[x^p[n]=(-)2x[n],$$

wherein $x^1[n]$ and $x^2[n]$ are the first and the second differential signal outputs, wherein $x^n[n]$ and $x^p[n]$ are the first and the second differential signals, and where $x[n]$ is a differential component.

9. The circuit according to claim 8, wherein the first and the second discriminated signal is represented by the following formula:

$$OUTPUT1[n]=-A*SIGN(X);$$

$$OUTPUT2[n]=-A*SIGN(-X);$$

wherein OUTPUT1[$n$] is the first discriminated signal, OUTPUT2[$n$] is the second discriminated signal, A is a predefined constant;
wherein the differential non-linear discriminator extracts the value of SIGN(X) and SIGN(-X) from $x^1[n]$ and $x^2[n]$; wherein SIGN(X)=(+) if X$\geq$0 or if $x^1[n]>x^2[n]$, and; wherein SIGN(X)=(-) if X<0 or if $x^1[n]<x^2[n]$.

10. A method of generating a random signal comprising:
   a. capturing a first and a second differential signal input via a differential sample and hold circuit, the differential sample and hold circuit having a first differential signal output and a second deferential signal output;
   b. applying a differential non-linear discriminator function to the first and the second differential signal outputs via a differential non-linear discriminator circuit, the differential non-linear discriminator circuit having a first discriminated signal and a second discriminated signal;
   c. routing the first and the second discriminated signals to the first and the second differential signal inputs via a corresponding first and second loop feed back.

11. The method according to claim 10, wherein the differential non-linear discriminator circuit extracts a polarity of the first and the second differential signal outputs.

12. The method according to claim 11, wherein the first and the second discriminated signals are a function of the first and the second differential signal output polarities.

13. The method according to claim 12, wherein the differential sample and hold circuit generates an intrinsic symmetric map.

14. The method according to claim 13, wherein the differential non-linear discriminator circuit compares the first and the second differential signal outputs at a differential amplifier input.

15. The method according to claim 10, wherein the first and the second differential signal inputs are differential signals divided from a single signal into two differential signals.

16. The method according to claim 10, wherein the first and the second differential signals are represented by the following formula:

$$x^n[n]=(-)x[n]+CM,$$

$$x^p[n]=x[n]+CM,$$

wherein $x^n[n]$ and $x^p[n]$ are the first and the second differential signals, $x[n]$ is a differential component, and CM is a common mode component.

17. The method according to claim 10, wherein the first and the second differential signal output is represented by the following formula:

$$x^1[n]=x^p[n]-x^n[n]=2x[n],$$

$$x^2[n]=x^n[n]-x^p[n]=(-)2x[n],$$

wherein $x^1[n]$ and $x^2[n]$ are the first and the second differential signal outputs, wherein $x^n[n]$ and $x^p[n]$ are the first and the second differential signals, and where $x[n]$ is a differential component.

18. The method according to claim 17, wherein the first and the second discriminated output signal is represented by the following formula:

$$OUTPUT1[n]=-A*SIGN(X);$$

$$OUTPUT2[n]=-A*SIGN(-X);$$

wherein $OUTPUT1[n]$ is the first discriminated signal, $OUTPUT2[n]$ is the second discriminated signal, A is a predefined constant;

wherein the differential non-linear discriminator extracts the value of SIGN(X) and SIGN(–X) from $x^1[n]$ and $x^2[n]$; wherein SIGN(X)=(+) if $X \geqq 0$ or if $x^1[n]>x^2[n]$, and; wherein SIGN(X)=(–) if $X<0$ or if $x^1[n]<x^2[n]$.

* * * * *